(12) United States Patent
Yoshida (10) Patent No.: US 11,254,005 B2
(45) Date of Patent: Feb. 22, 2022

(54) ROBOT CONTROL DEVICE

(71) Applicant: FANUC CORPORATION, Yamanashi (JP)

(72) Inventor: Nobuhiro Yoshida, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 314 days.

(21) Appl. No.: 16/597,876

(22) Filed: Oct. 10, 2019

(65) Prior Publication Data

US 2020/0114512 A1  Apr. 16, 2020

(30) Foreign Application Priority Data

Oct. 12, 2018 (JP) .............................. JP2018-193862

(51) Int. Cl.
*B25J 9/06* (2006.01)
*B25J 9/16* (2006.01)
(Continued)

(52) U.S. Cl.
CPC ......... *B25J 9/1676* (2013.01); *B25J 19/0004* (2013.01); *B25J 19/023* (2013.01); *B25J 19/06* (2013.01)

(58) Field of Classification Search
CPC .. B60R 2325/205; B60R 25/33; B60W 10/06; B60W 10/18; B60W 10/20; B60W 2556/50; B60W 50/14; G01S 5/0027; G08G 1/09; G08G 1/096791; G08G 1/0969; G08G 1/142; G08G 1/16; G08G 1/161; G08G 1/163; G08G 1/166; G08G 1/167; G08G 1/20; G08G 9/02; H04W 4/027; H04W 4/06; H04W 4/46; H04W 4/48;
(Continued)

(56) References Cited

U.S. PATENT DOCUMENTS

2004/0199288 A1* 10/2004 Watanabe ............ G05B 19/425
700/245
2017/0326734 A1* 11/2017 Iida ........................ B25J 9/1674
(Continued)

FOREIGN PATENT DOCUMENTS

JP  2009119579 A  6/2009
JP  2016172303 A  9/2016
(Continued)

OTHER PUBLICATIONS

Davidson, Real-time simultaneous localisation and mapping with a single camera, 2008, IEEE, p. 1-8 (Year: 2008).*
(Continued)

*Primary Examiner* — Marc McDieunel
(74) *Attorney, Agent, or Firm* — Hauptman Ham, LLP (57) ABSTRACT

A robot control device includes a camera configured to be attached to a display device carried by or put on an operator and capture an environment surrounding the operator to generate an image of the environment; and a processor configured to slow down or stop motion of a predetermined robot included in the environment when the predetermined robot is not displayed on the display device, when only a portion of the predetermined robot is displayed, or when a ratio of a region representing the predetermined robot to a display area of the display device is equal to or lower than a predetermined threshold.

4 Claims, 8 Drawing Sheets

(51) Int. Cl.
*B25J 19/00* (2006.01)
*B25J 19/06* (2006.01)
*B25J 19/02* (2006.01)

(58) Field of Classification Search
CPC .......... H04W 56/0035; H04W 64/006; H04W 72/005; H04W 72/0446; H04W 74/0816; H04W 76/14; H04W 76/40
See application file for complete search history.

(56) References Cited

U.S. PATENT DOCUMENTS

| | | | |
|---|---|---|---|
| 2020/0055195 A1* | 2/2020 | Ignakov | B25J 13/08 |
| 2020/0101613 A1* | 4/2020 | Yamada | B25J 9/1697 |
| 2020/0215691 A1* | 7/2020 | Saruta | B25J 9/1697 |
| 2020/0259896 A1* | 8/2020 | Sachs | G07C 9/00174 |
| 2021/0114205 A1* | 4/2021 | Cristache | G06K 7/10366 |

FOREIGN PATENT DOCUMENTS

| | | |
|---|---|---|
| JP | 2016-209991 A | 12/2016 |
| JP | 2016224547 A | 12/2016 |

OTHER PUBLICATIONS

Han et al., Mobile Robot Based on FPGA, 2018, IEEE, p. 576-579 (Year: 2018).*

Nishii et al., Marionette system for operating and displaying whole-body motion: evaluation of tele-manipulation using Marionette device, 2005, IEEE, p. (Year: 2005).*

Ohya et al., Vision-based navigation of mobile robot with obstacle avoidance by single camera vision and ultrasonic sensing, 1997, IEEE, p. (Year: 1997).*

* cited by examiner

ROBOT CONTROL DEVICE

RELATED APPLICATIONS

The present application claims priority of Japanese Application Number 2018-193862, filed Oct. 12, 2018, the disclosure of which is hereby incorporated by reference herein in its entirety.

FIELD

The present invention relates to, for example, a robot control device configured to control a robot.

BACKGROUND

When an operator teaches a robot including a movable member such as an arm driven by a servomotor about an operation to be implemented by the robot, or when such a robot and the operator work in cooperation, the operator may make contact with the robot. If such a contact occurs without the operator's intention, the operator may face a danger. Accordingly, a technique in which a recognition status of a human on a robot is estimated on the basis of predetermined information on the human, which is extracted from an image of the human, and motion of the robot is controlled on the basis of a result of estimation of the recognition status and a result of estimation of contact between the robot and the human has been proposed (see, for example, Japanese Unexamined Patent Publication (Kokai) No. 2016-209991).

SUMMARY

In the technique, a visual range of the human is estimated on the basis of an image captured by a visual sensor, and it is estimated whether or not the human recognizes the robot on the basis of a result of determination of whether or not a position of the robot likely to make contact with human is located within the visual range of the human. However, depending on environments where the robot is placed, various objects such as other devices other than the robot and an operator may exist. In such a case, depending on a positional relationship between the visual sensor and the human, some objects may interrupt an imaging range of the visual sensor. Accordingly, the head of the human is not represented in an image captured by the visual sensor and therefore it may be difficult to estimate the visual range of the human.

In one aspect, it is an object to provide a robot control device that can reduce a possible danger of contact of a robot with an operator or another object regardless of a positional relationship between the operator and the robot.

In one embodiment, a robot control device is provided. The robot control device includes: a camera configured to be attached to a display device carried by or put on an operator and capture an environment surrounding the operator to generate an image of the environment; and a processor configured to slow down or stop motion of a predetermined robot included in the environment when the robot is not displayed on the display device, when only a portion of the robot is displayed, or when a ratio of a region representing the robot to a display area of the display device is equal to or lower than a predetermined threshold.

According to another embodiment, a robot control device is provided. The robot control device includes: a display device configured to be able to be worn by an operator and be able to display information generated by a computer in an overlapping manner with an actual environment; a sensor configured to be attached to the display device or the head of the operator and output a measurement signal indicating an amount of displacement of the display device or an amount of displacement of the head of the operator; and a processor configured to estimate a visual range being visually recognizable for the operator through the display device by using the measurement signal, determine whether or not a predetermined robot included in the environment is included in the estimated visual range, and slow down or stop motion of the predetermined robot when the predetermined robot is not included in the visual range.

According to one aspect, a possible danger of contact of a robot with an operator or another object can be reduced regardless of a positional relationship between the operator and the robot.

DESCRIPTION OF EMBODIMENTS

With reference to the drawings, a robot control device will be described below. The robot control device displays, on a display of a display device carried by or put on an operator, an image of an environment surrounding the operator, which is captured by a camera attached to the display device. Then, the robot control device stops motion of a robot (i.e., operation of a robot) when the robot controlled by the robot control device is not represented in a display area of the image displayed on the display. Alternatively, the robot control device estimates a visual range that the operator can visually recognize through a transmissive display by using a measurement signal measured by a sensor attached to the display device that is put on the operator and that includes the transmissive display. The sensor is configured to measure movements of the head of the operator. When the robot is not present in the visual range estimated by the robot control device, the robot control device stops the motion of the robot.

The robot control device is applicable, for example, in a case where teaching is given to the robot, a case where the robot is operated and thereby some works are done, or a case where a maintenance work is done on the robot.

Figure 1:
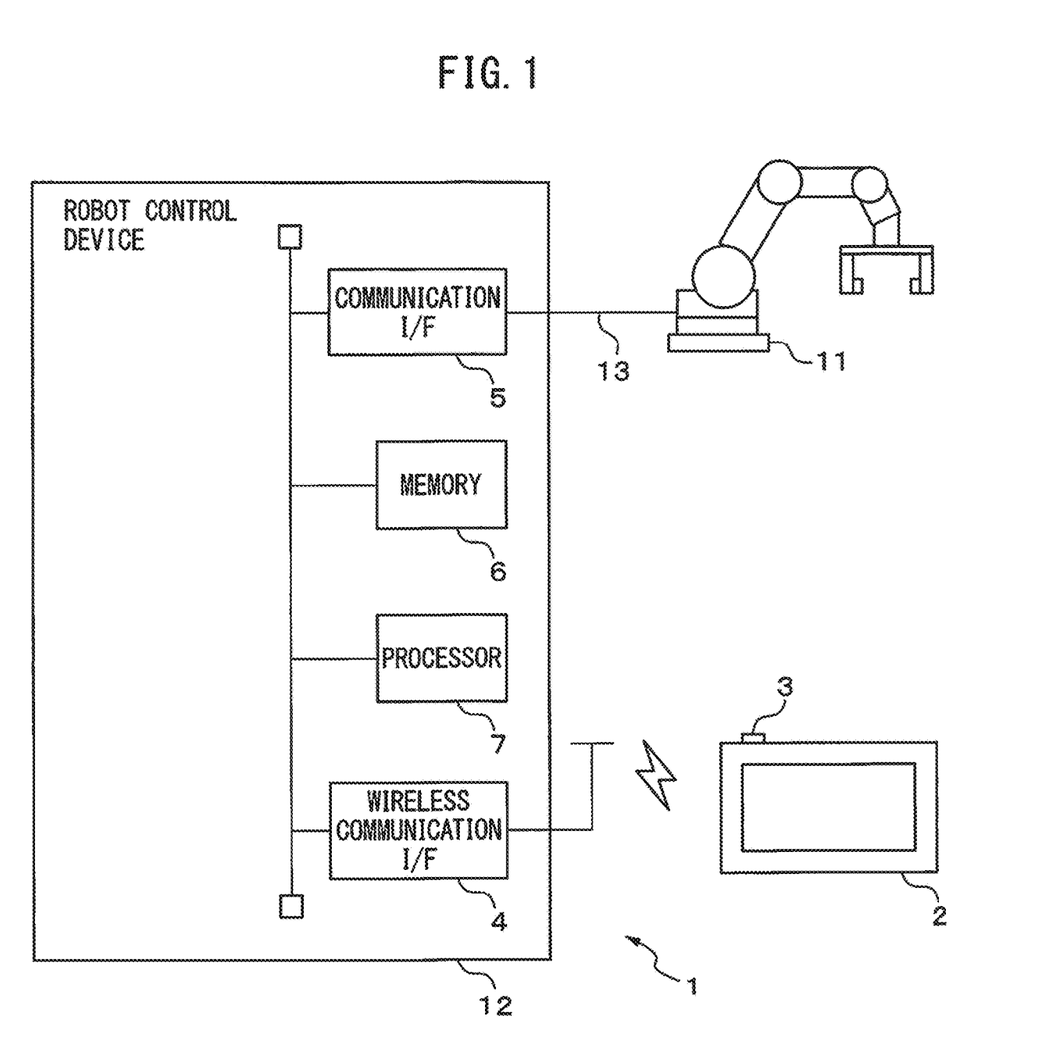
FIG. 1 is a schematic configuration diagram of a robot control device according to a first embodiment.

FIG. 1 is a schematic configuration diagram of a robot control device according to a first embodiment. A robot control device 1 includes a display device 2, a camera 3, a wireless communication interface 4, a communication interface 5, a memory 6, and a processor 7. Among these units, the wireless communication interface 4, the communication interface 5, the memory 6, and the processor 7 are housed in a body 12 of the robot control device 1. Further, the wireless communication interface 4, the communication interface 5, and the memory 6 are communicatively connected via a processor 1 and a signal line so as to communicate with one another. Furthermore, the display device 2 and the camera 3 are connected via the wireless communication interface 4 to the body 12 so as to communicate with the body 12 by wireless communication compliant with a predetermined wireless communication standard such as Bluetooth (registered trademark). In addition, the robot control device 1 controls a robot 11 via a communication line 13.

In this example, the robot 11 includes at least one shaft, and the at least one shaft is driven by a servomotor (not illustrated) and thereby the position and orientation of the robot 11 are changed. Further, in accordance with an operation by the operator or a preliminary-set control program for the robot 11, the robot control device 1 controls the servomotor via the communication line 13 so that the robot 11 is brought into predetermined position and orientation. Furthermore, the robot control device 1 receives the amount of rotation of the shaft driven by the servomotor etc., via the communication line 13 from the robot 11 and thus detects the position and orientation of the robot 11.

The display device 2 is, for example, a mobile display device that the operator can carry or wear, such as a mobile device such as a tables device or a wearable device including a head-mounted display wearable on the head of the operator. The display device 2 is configured to display an image captured by the camera 3 of an environment surrounding the operator. If the display device 2 is a mobile device, the display device 2 includes, for example, a touch panel display, a processor, and a wireless communication interface. The processor generates an operation signal corresponding to an operation via the touch panel display, or displays, on the touch panel display, display data such as an operation icon that is received from the body 12 to be used for operating the robot 11 or an image received from the camera 3. The wireless communication interface generates a wireless signal including the operation signal generated by the processor and transmits the wireless signal to the body 12, or receives a wireless signal from the body 12. In addition, the touch panel display is an example of a display unit.

For example, the operator touches an operation icon etc., displayed on the touch panel display, and thereby the processor of the display device 2 generates an operation signal representing an operation corresponding to the operation icon (for example, an operation to move a predetermined portion of the robot 11 in any direction, or an operation to rotate the robot about any of the axes as an rotation axis in an orthogonal coordinate system set to the predetermined portion). Further, an predetermined operation to the touch panel display is performed by the operator, and thereby the processor of the display device 2 may enlarge or reduce an image that is captured by the camera 3 to be displayed on the touch panel display or may trim a portion of an image captured by the camera 3 to display the image on the touch panel display. In this case, every time a range of the image displayed on the touch panel display (hereinafter, the range will be simply referred to as a display area) is changed, the processor of the display device 2 may incorporate information representing the display area (for example, coordinates of the left upper end and the right lower end in the display area on the image) into a wireless signal and transmit the wireless signal to the body 12. In addition, the display area is set in advance, and if the display area is not changed, the display device 2 does not have to notify the display area to the body 12. Further, if the display device 2 displays the entire image on the touch panel display, the entire image is the display area.

Furthermore, if the display device 2 is a wearable device, the display device 2 may include, instead of the touch panel display, a display such as a liquid crystal display for simply display purpose. Moreover, the display may be a transmissive display. In this case, the robot control device 1 may include an input device (not illustrated) which operates the robot 11 and can communicate with the body 12 by wireless communication, separately from the display device 2.

Hereinafter, the touch panel display included in the display device 2 may be simply referred to as a display.

The camera 3 is an example of an imaging unit and is attached to, for example, the display device 2. For example, if the display device 2 is a mobile device, the camera 3 is attached to the back side of a surface on which the display of the display device 2 is provided. Alternatively, the camera 3 may be attached to the display device 2 and located at an upper end of the display device 2 so as to direct upward from the display device 2, for example, when the operator carries the display device 2 to work while looking at the display of the display device 2 (i.e., so as to direct forward from the operator when the operator carries the display device 2 such that the display of the display device 2 is horizontally disposed). Thus, even when the operator does not face toward the robot 11, the camera 3 can capture the robot 11 in an image. Further, if the display device 2 is a wearable device, the camera 3 is attached to the display device 2 so as to direct forward from the operator who is wearing the display device 2. In addition, the camera 3 is connected to the display device 2, for example, so as to communicate with the display device 2. During controlling of the robot 11 by the robot control device 1, the camera 3 captures an environment surrounding the operator to generate an image of the environment and transmits the generated image to the display device 2 and transmits the generated image with a wireless signal through the display device 2 to the body 12 in every predetermined imaging period.

The wireless communication interface 4 includes a circuit and the like configured to execute processing relating to transmission and reception of a wireless signal compliant with the predetermined wireless communication standard. Further, the wireless communication interface 4 extracts information such as an operation signal, an image, or a display area which is included in the wireless signal received from the display device 2, and passes the information to the processor 7. Furthermore, the wireless communication interface 4 generates a wireless signal including display data that is received from the processor 1 to be displayed on the display device 2, and transmits the generated wireless signal to the display device 2.

The communication interface 5 includes, for example, a communication interface configured to connect the robot control device 1 to the communication line 13, a circuit configured to execute processing relating to transmission and reception of a signal via the communication line 13, and the like. Further, the communication interface 5 outputs control information via the communication line 13 to the robot 11. The control information received from the processor 7 is, for example, a torque command value for the servomotor of the robot 11. Furthermore, the communication interface 5 receives, from the robot 11 through the communication line 13, information representing an operation status of the servomotor, and passes the information to the processor 7. The information includes a feedback current value of the servomotor, an encoder signal from an encoder, which represents the amount of rotation of the shaft of the robot 11 driven by the servomotor, and the like.

The memory 6 is an example of a storage unit, and the memory 6 includes, for example, a readable/writable semiconductor memory and a read-only semiconductor memory. The memory 6 may further include a storage medium such as a semiconductor memory card, a hard disk, or an optical storage medium, and a device for allowing access to the storage medium.

The memory 6 stores computer programs and the like for controlling the robot 11, which are executable in the processor 7. Further, the memory 6 stores display data such as an operation icon for operating the robot 11. The operation icon is displayed on the display device 2 to be used for operating the robot 11. Furthermore, the memory 6 stores information representing an operation status of the servomotor, which is obtained from the robot 11 during motion of the robot 11, various types of data generated during execution of a robot control process, and images obtained from the camera 3.

The processor 7 includes, for example, a Central Processing Unit (CPU) and a peripheral circuit of the CPU. The processor 7 may further include a processor unit for numeric operations. In addition, the processor 7 executes the robot control processing.

Figure 2:
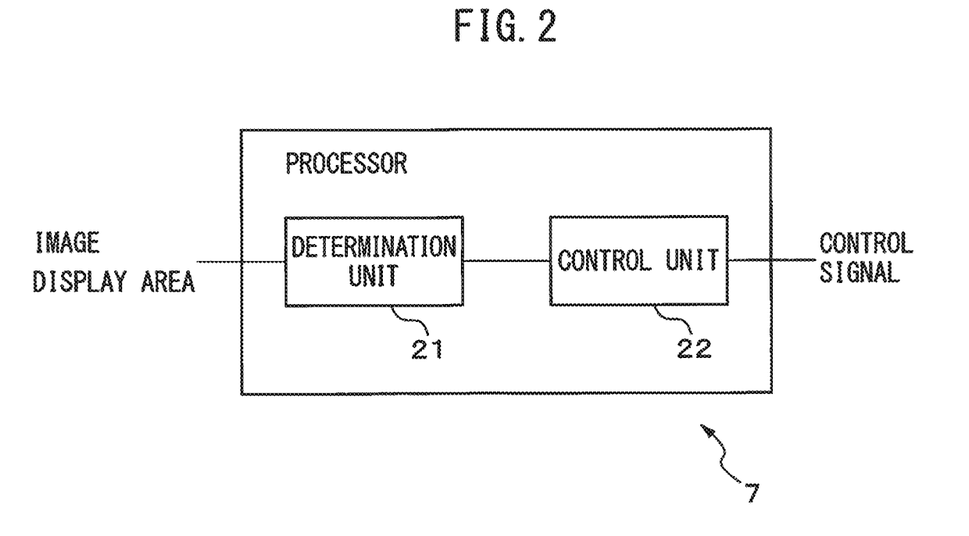
FIG. 2 is a function block diagram of a processor relating to robot control processing.

FIG. 2 is a function block diagram of the processor 7 relating to the robot control processing. The processor 7 includes a determination unit 21 and a control unit 22. Each of the units included in the processor 7 is, for example, a functional module achieved by a computer program executed on the processor 7. Alternatively, each of the units may be mounted in the processor 7 so as co serve as a dedicated arithmetic circuit provided in a part of the processor 7.

Every time receiving, via the wireless communication interface 4, an image generated by the camera, the determination unit 21 determines whether or not the robot 11 is recognizable for an operator through the display device 2. In the first embodiment, the determination unit 21 determines whether or not the robot 11 is represented in a display area of the received image. When the robot 11 is represented in the display area of the received image, the determination unit 21 determines that the robot 11 is recognizable for the operator through the display device 2.

For example, the determination unit 21 inputs values of pixels in the display area of the image or a feature value such as histogram of oriented gradients (HOG) calculated from values of pixels in the display area to a classifier that has been learned in advance for detecting the robot 11, and thereby detects a region in the display area of the image in which the robot 11 is represented. The determination unit 21 may use, as such a classifier, for example, a neural network or AdaBoost. Alternatively, the determination unit 21 executes template matching between a template representing the robot 11 and the display area of the image by changing a relative position between the template and the display area of the image, and thereby may detect the region in the display area of the image in which the robot 11 is represented. In addition, for plural possible relative positional relationships between the camera 3 and the robot 11, plural templates representing the orientation of the robot 11 viewed from the camera 3 in each of the plural relative positional relationships may be stored in advance in the memory 6. Then, the determination unit 21 may execute template matching between each of the plural templates and the display area of the image. Further, if any marker for identification is applied to the robot 11, a template may represent the marker. In this case, for example, when the determination unit 21 executes template matching between the template representing the marker and the display area of the image and the marker is detected, the determination unit 21 may determine that the region representing the robot 11 has been detected.

In addition, the determination unit 21 may determine by executing the foregoing processing to the entire image whether or not the robot 11 is represented in the image. Then, when the region representing the robot 11 is not detected in the entire image by the determination unit 21 or when the region representing the robot 11 is out of the display area, the determination unit 21 may determine that the region representing the robot 11 has not been detected in the display area of the image.

When the region representing the robot 11 has been detected in the display area of the image, the determination unit 21 determines that the robot 11 is represented in the display area of the image. In contrast, when the region representing the robot 11 has been not detected in the display area of the image, the determination unit 21 determines that the robot 11 is not represented in the display area of the image, i.e., that the robot 11 is not recognizable for the operator through the display device 2.

Every time determining whether or not the robot 11 is represented in the display area of the image, the determination unit 21 notifies the determination result to the control unit 22.

Every time the determination result of whether or not the robot 11 is represented in the display area of the image is notified to the control unit 22 by the determination unit 21, in accordance with the determination result, the control unit 22 controls the robot 11 to operate or stop.

In the first embodiment, when the notified determination result indicates that the robot 11 is represented in the display area of the image, the control unit 22 continues motion of the robot 11. In contrast, when the notified determination result indicates that the robot 11 is not represented in the display area of the image, the control unit 22 outputs a control signal for stopping motion of the robot 11 through the communication interface 5 and the communication line 13 to the robot 11 to stop the motion of the robot 11.

In addition, only when determining that the robot 11 is not represented in the display area of the image, the determination unit 21 may notify the determination result to the control unit 22. Then, when the determination result that the robot 11 is not represented in the display area of the image is notified to the control unit 22 by the determination unit 21, the control unit 22 may output a control signal for stopping motion of the robot 11 through the communication interface 5 and the communication line 13 to the robot 11 to stop the motion of the robot 11.

Moreover, the determination unit 21 may notify the region on the image where the robot 11 is represented, to the control unit 22 together with the determination result. Then, even when a size ratio of the region on the image where the robot 11 is represented, to the display area of the image is equal to or lower than a predetermined threshold (for example 0.2 to 0.3), the control unit 22 may output a control signal for stopping motion of the robot 11 through the communication interface 5 and the communication line 13 to the robot 11. Therefore, even when the robot 11 represented in the display area of the image is too small or when only a part of the robot 11 is represented in the display area and thus the operator has difficulty confirming details of the motion of the robot 11, the control unit 22 can stop the motion of the robot 11.

Figure 3:
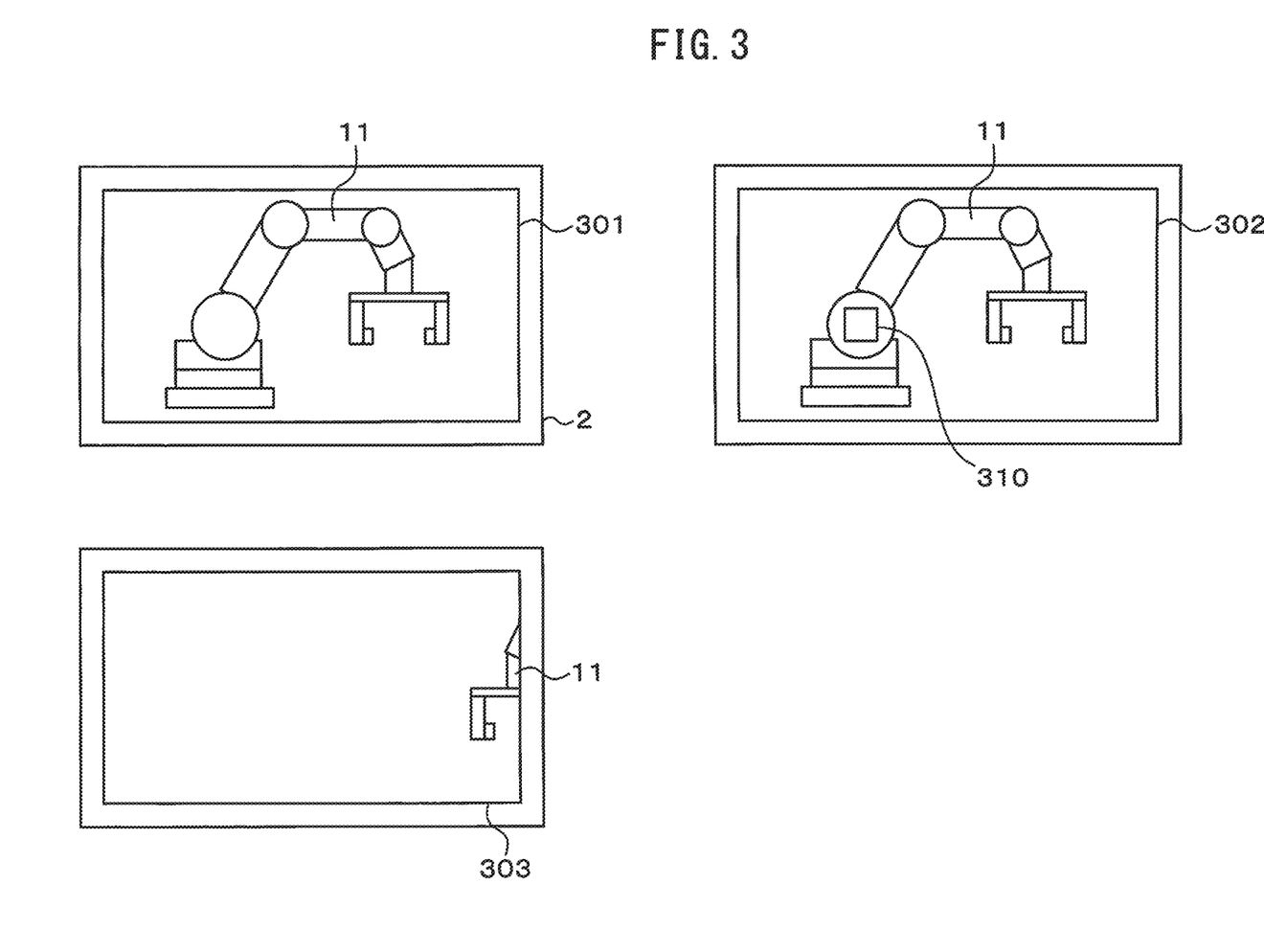
FIG. 3 is a diagram illustrating an example of a relationship between an image displayed on a display device and a control for a robot.

FIG. 3 is a drawing illustrating an example of a relationship between an image displayed on the display device 2 and a control for the robot 11. As seen in a display area 301 in an image displayed on the display of the display device 2, when the entire robot 11 is represented in the display area 301, the operator can visually recognize the robot 11 through the display device 2. Therefore, the robot control device 1 does not stop motion of the robot 11. Likewise, as seen in a display area 302, when a marker 310 utilized to detect the robot 11 is represented in the display area 302, the robot control device 1 does not stop motion of the robot 11. In contrast, when a region representing the robot 11 is very small as seen in a display area 303 or when the robot 11 is not represented in the display area, the operator cannot confirm details of the motion of the robot 11 through the display device 2. Therefore, the robot control device 1 stops the motion of the robot 11.

Figure 4:
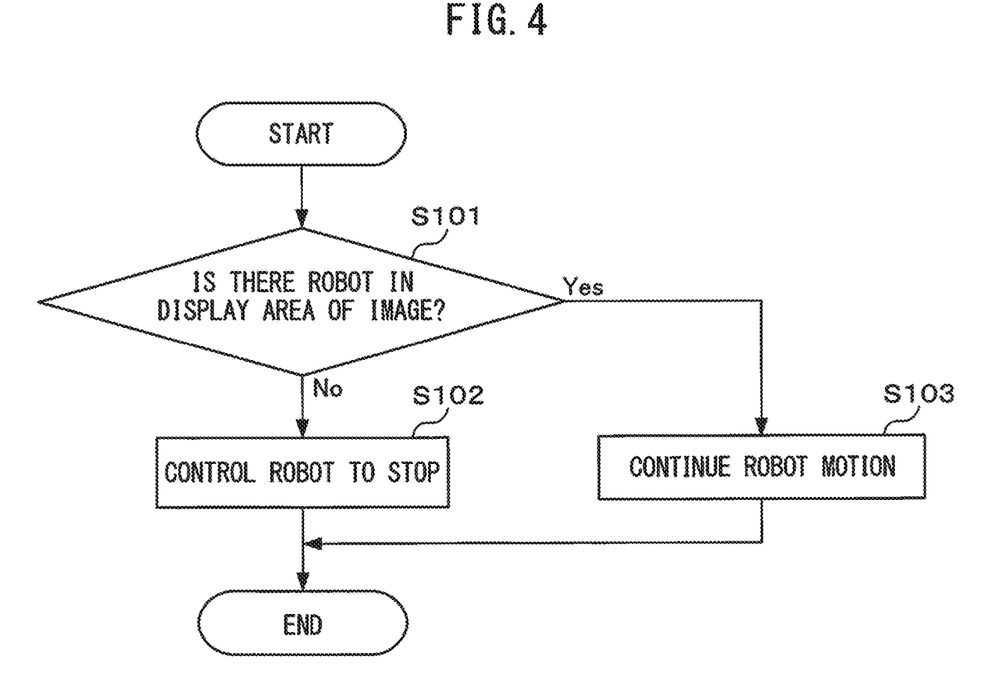
FIG. 4 is an operation flow chart of the robot control processing according to the first embodiment.

FIG. 4 is an operation flow chart of the robot control processing according to the first embodiment. For example, every time receiving an image generated by the camera 3, the processor 7 executes the robot control processing in accordance with the following operation flow chart.

The determination unit 21 determines whether or not the robot 11 is represented in a display area of the image generated by the camera 3 (step S101). When the robot 11 is not represented in the display area of the image (No in step S101), the control unit 22 stops motion of the robot 11 (step S102).

In contrast, when the robot 11 is represented in the display area of the image (Yes in step S101), the control unit 22 continues the motion of the robot 11 (step S103).

After step S102 or S103, the processor 7 finishes the robot control processing.

As described above, the robot control device according to the first embodiment stops motion of a robot when the robot is not represented in a range, which is displayed on a display device, of an image generated by a camera that is carried by an operator or is attached to the display device. Therefore, when the operator cannot confirm the motion of the robot, the robot control device can stop the motion of the robot regardless of a positional relationship between the operator and the robot. As a result, the robot control device can reduce a possible danger of contact of the robot with the operator or another object. Further, the robot control device determines on the basis of the image displayed on the display device whether to stop the motion of the robot or not. Therefore, even when the operator is doing some works while watching the display device but not looking at the robot, the robot control device can appropriately determine whether to stop the motion of the robot or not.

According to a modified example, for each image received from the camera 3 over a predetermined period (for example, for 1 to 3 seconds), when the determination unit 21 determines that the robot 11 is not represented in a display area of the image, the control unit 22 may stop motion of the robot 11. By doing so, when an operator cannot visually recognize the robot 11 for only a moment in the display area of the image displayed on the display device 2 and immediately afterwards the operator can visually recognize the robot 11, the robot control device 1 allows the robot 11 to continue operating. Consequently, a decrease in working efficiency due to frequent stopping of the robot 11 can be prevented.

In addition, depending on environments, plural robots of the same type are placed. Therefore, by changing an imaging direction of the camera 3, any of the plural robots may be captured by the camera 3. In such a case, even if any of the robots is represented on the image, the robot does not necessarily correspond to the robot 11 controlled by the robot control device 1.

Thus, according to another modified example, when the robot has been detected in the display area of the image, the determination unit 21 may determine whether or not the detected robot is the robot 11 controlled by the robot control device 1. Then, only when the detected robot has been confirmed as the robot 11 controlled by the robot control device 1, the determination unit 21 may determine that the robot 11 is represented in the display area of the image.

In this case, for example, for each of the robots, a marker (an identification marker) including robot identification information adapted to differentiate the robot from the other robots is applied to the robot. The marker may be, for example, a QR code (registered trademark), a bar code, or a marker representing an identification number.

When a region representing the robot is detected in the display area of the image, the determination unit 21 detects, from the region, a marker region representing the marker. To do this, for example in the same way as in a case of detecting the robot, the determination unit 21 inputs the region representing the robot or a feature value extracted from the region to a classifier that has been learned in advance for detecting the marker, and thereby detects the marker region. The determination unit 21 may use, as such a classifier, for example, a neural network or AdaBoost. Alternatively, the determination unit 21 executes template matching between a template representing the marker and the region representing the robot by changing a relative position between the template and the region representing the robot, to detect the marker region in the region representing the robot. Then, the determination unit 21 executes processing for analyzing robot identification information represented by the marker to the marker region to read the robot identification information represented by the marker. For example, if the marker is a QR code or a bar code, the determination unit 21 may execute processing for reading the QR code or the bar code. If an identification number is represented on the marker, the determination unit 21 may execute predetermined character recognition processing. Then, the determination unit 21 determines whether or not the identification number of the robot represented in the read robot identification information coincides with an identification number of the robot 11 that is controlled by the robot control device 1. The identification number of the robot 11 is stored in advance in the memory 6. When the identification number of the robot represented in the robot identification information coincides with the identification number of the robot 11 controlled by the robot control device 1, the determination unit 21 determines that the robot represented in the display area of the image is the robot 11 controlled by the robot control device 1. In contrast, when the identification number of the robot represented in the robot identification information does not coincide with the identification number of the robot 11 controlled by the robot control device 1, the determination unit 21 determines that the robot represented in the display area of the image is not the robot 11 controlled by the robot control device 1.

Alternatively, when motion of the robot, which is executed in accordance with an instruction from an operator is different from motion of the robot which is represented in display areas of a series of time-series images generated by the camera 3, the determination unit 21 may determine that the robot 11 is not represented in the display area of each of the images, i.e., that the robot 11 is not recognizable for an operator through the display device 2. In this case, for example, from each of a series of the time-series images generated by the camera 3 within a certain period after the operator operates the robot 11 via the display device 2 or the input device so that the robot 11 executes a predetermine motion, the determination unit 21 detects a portion of the robot (for example, an end of an arm of the robot) moving while executing the predetermined motion. Then, the determination unit 21 calculates a moving trajectory of the portion, which connects positions of the portion in the respective time-series images. When the amount of movement of the portion along the moving trajectory is below a predetermined threshold, it is estimated that the portion of the robot represented in the display area of each image does not move in accordance with the operation instructed by the operator. Therefore, the determination unit 21 determines that the robot represented in the display area of each image is not the robot 11 controlled by the robot control device 1.

In addition, as details relating to a second embodiment will be described below, when a sensor such as a gyroscope sensor configured to measure motion of the display device 2 is provided at the display device 2 and a relative positional relationship between the display device 2 and the robot 11 can be estimated by using a measurement signal measured by the sensor, the determination unit 21 may virtually project, on an image, a moving trajectory of a predetermined portion of the robot 11 in accordance with an operation instructed by an operator. Then, the determination unit 21 compares the moving trajectory virtually projected with a moving trajectory calculated from a series of images and thereby may determine whether or not the robot represented in the display area of the image is the robot 11 controlled by the robot control device 1. In this case, the moving trajectory of the predetermined portion of the robot 11 in accordance with the operation instructed by the operator is represented in a world coordinate system that is set to have a predetermined reference point on a real space as an origin, and on the basis of the relative positional relationship between the display device 2 and the robot 11, the determination unit 21 converts the moving trajectory to a moving trajectory represented in a camera coordinate system which is set to the camera 3. Then, the determination unit 21 may execute projection processing for the moving trajectory in the camera coordinate system to virtually project, on the image, the moving trajectory of the predetermined portion of the robot 11 in accordance with the operation instructed by the operator. Then, for any point on the moving trajectory virtually projected, when a distance from the moving trajectory calculated from a series of images is equal to or greater than a predetermined threshold, it is estimated that the motion of the predetermined portion of the robot represented in the display area of the image is different from the operation instructed by the operator. Therefore, the determination unit 21 may determine that the robot represented in the display area of the image is not the robot 11 controlled by the robot control device 1.

Further, separately from the camera 3 or instead of the camera 3, a 3D sensor (not illustrated) may be provided at the display device 2. The 3D sensor is configured to measure a distance to an object around the display device 2 and generate a distance image representing the distance. The 3D sensor is another example of the imaging unit. In this case, for example, the determination unit 21 detects a portion of the robot, which moves in accordance with a predetermined motion, from plural distance images generated by the 3D sensor within a certain period after an operator operates the robot 11 via the display device 2 or the input device so that the robot 11 executes the predetermined motion. In this case, for example, on the basis of a position of the portion on the image generated by the camera 3 and a positional relationship between the camera 3 and the 3D sensor, the determination unit 21 may identify the position of the portion on the distance image. Alternatively, the determination unit 21 may identify the position of the portion on the distance image by executing template matching between a template representing the portion on the distance image and the distance image. When an absolute value of a difference between a distance to the portion represented in the initial distance image in the certain period and a distance to the portion represented in each of the distance images in the certain period is below a predetermined threshold, it is estimated that the predetermined portion of the robot represented in the display area of the image does not move in accordance with the instructed operation. Therefore, the determination unit 21 may determine that the robot represented. In the display area of the image is not the robot 11 controlled by the robot control device 1.

Alternatively, the determination unit 21 calculates an origin position of the robot 11 at a certain time point on the basis of a position and a posture of a predetermined portion of the robot, which are detected in a distance image at the certain time point and on the basis of position information of each of shafts of the robot 11, which is derived from an encoder signal etc., obtained through the communication interface 5 from the robot 11. In addition, the determination unite 21 calculates an origin position of the robot 11 after a predetermined time period elapsed from the certain time point on the basis of a position and a posture of the predetermined portion of the robot, which are detected in a distance image obtained after the predetermined time period elapsed from the certain time point and on the basis of position information of each of the shafts of the robot 11, which is derived from an encoder signal, etc., obtained through the communication interface 5 from the robot 11. When a difference between the origin position of the robot 11 at the certain time point and the origin position of the robot 11 after the predetermined time period elapsed from the certain time point is equal to or greater than a predetermined threshold, the determination unit 21 may determine that the robot represented in the display area of the image is not the robot 11 controlled by the robot control device 1.

In addition, when the plural robots are represented in the display area of the image, the determination unit 21 may execute the foregoing processing for each of the plural robots. When each of the plural robots is different from the robot 11 controlled by the robot control device 1, the determination unit 21 may determine that the robot 11 is not represented in the display area of the image.

Next, a robot control device according to the second embodiment will be described. In the robot control device according to the second embodiment, a display device includes a transmissive display and a sensor configured to measure movements of the head of an operator. The robot control device estimates a visual range that the operator can visually recognize through the display by using a measurement signal measured by the sensor and representing the amount of displacement of the head of the operator. When the robot is not present in the estimated visual range, the robot control device stops motion of the robot.

The robot control device according to the second embodiment is different in the configuration of the display device and processing of a processor of the robot control device compared with the robot control device according to the first embodiment. Thus, the following will describe these differences and relevant parts. For other components of the robot control device according to the second embodiment, refer to the descriptions of the corresponding components in the first embodiment described above.

Figure 5:
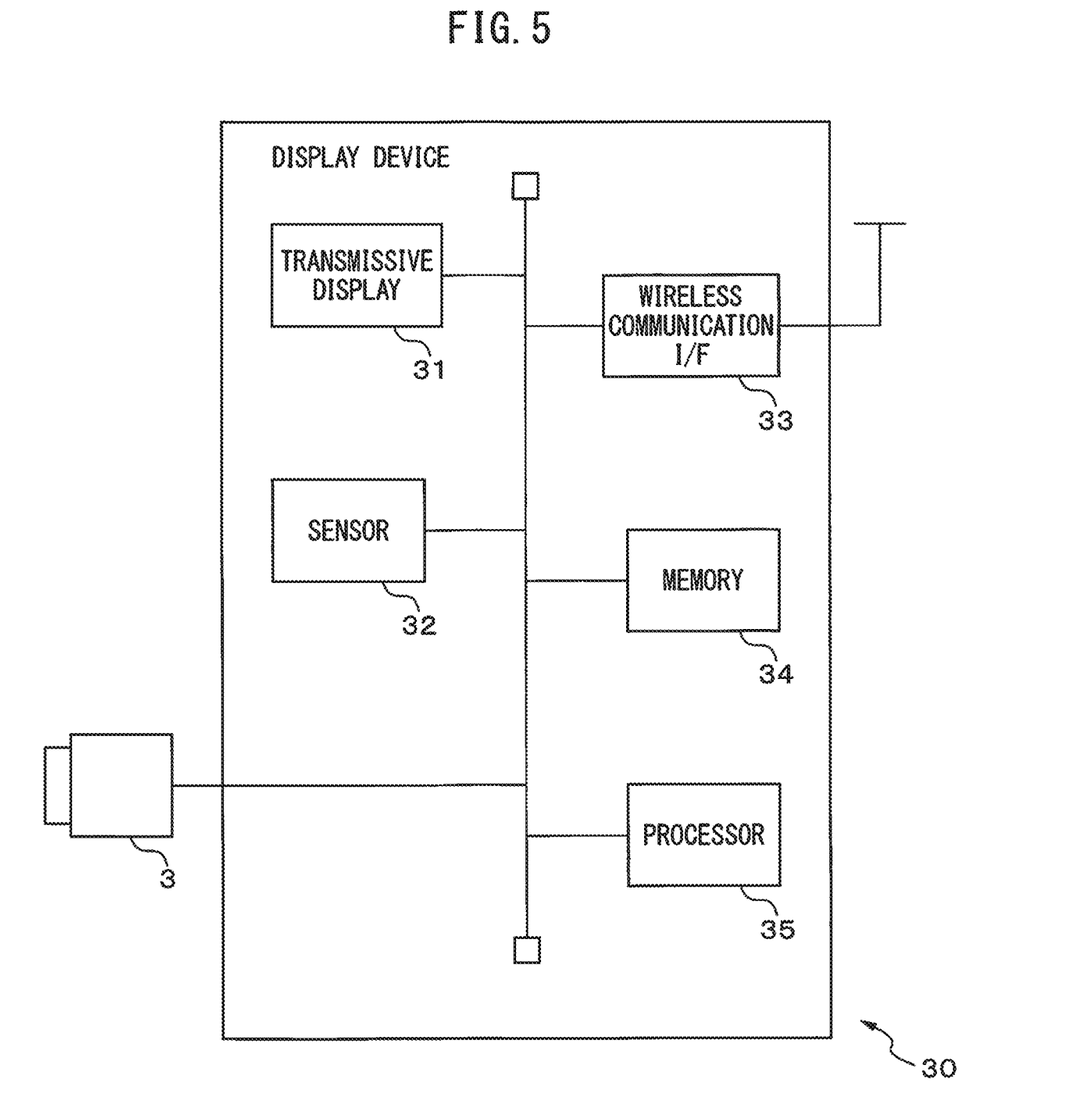
FIG. 5 is a schematic configuration diagram of a display device included in a robot control device according to a second embodiment.

FIG. 5 is a schematic configuration diagram of a display device included in a robot control device according to a second embodiment. A display device 30 according to the second embodiment is an example of a display device that can display information generated by a computer in an overlapping manner with an actual environment. For example, the display device 30 is a head-mounted wearable device or a wearable glass display device. The display device 30 includes a transmissive display 31, a sensor 32, a wireless communication interface 33, a memory 34, and a processor 35. The display device 30 further includes a wearable member (not illustrated) adapted to arrange the transmissive display 31 in an overlapping manner with operator's vision when the display device 30 is put on the head or glasses of an operator. In addition, the camera 3 is attached to the display device 30 so as to direct forward from the operator wearing the display device 30. The camera 3, the transmissive display 31, the sensor 32, the wireless communication interface 33, and the memory 34 are communicatively connected via a signal line to the processor 35.

The transmissive display 31 includes, for example, a liquid crystal display and displays various types of display data received from the processor 35, in an overlapping manner with the operator's vision.

The sensor 32 is an example of a displacement measurement unit. The sensor 32 is configured to measure movements of the display device 30 or the head of the operator in every certain period and output a measurement signal indicating the amount of displacement of the display device 30 or the head to the processor 35. The sensor 32 includes, for example, at least one of a gyroscope sensor, an acceleration sensor, and another sensor that can measure movements of the display device 30 or the head of the operator. In addition, separately from the display device 30, the sensor 32 may be attached to the head of the operator.

The wireless communication interface 33 includes a circuit and the like configured to execute processing relating to transmission and reception of a wireless signal compliant with the predetermined wireless communication standard. The wireless communication interface 33 generates a wireless signal including an image generated by the camera 3 or a measurement signal measured by the sensor 32, which is received from the processor 35, and transmits the generated wireless signal to the body 12. Further, the wireless communication interface 33 extracts display data, etc., included in the wireless signal received from the body 12, and passes the extracted display data for display on the display device 2 to the processor 35.

The memory 34 includes, for example, a readable/writable semiconductor memory and a read-only semiconductor memory. The memory 34 temporarily stores, for example, the measurement signal received from the sensor 32, the image received from the camera 3, the display data, etc. Further, the memory 34 may store various types of data applicable in processing by the processor 35.

The processor 35 includes, for example, a Central Processing Unit (CPU) and a peripheral circuit of the CPU. The processor 35 may further include a processing unit for graphics processing. The processor 35 displays the display data, etc., extracted from the received wireless signal on the transmissive display 31. Further, the processor 35 passes the image received from the camera 3 or the measurement signal received from the sensor 32 to the wireless communication interface 33.

In this embodiment, prior to robot control processing, the processor 7 executes calibration processing for calculating a relative positional relationship between the display device 30 and the robot 11. In the calibration processing, the display device 30 is firstly put on the operator, and the robot 11 is captured by the camera 3 in a state where the operator can visually recognize, through the transmissive display 31, the robot 11 stopped in a predetermined posture. Then, an image representing the robot 11 is transmitted with the wireless signal from the display device 30 to the body 12.

The processor 7 executes template matching processing between the received image and plural templates corresponding to each of possible relative positional relationship between the display device 30 and the robot 11, and thereby identifies the most coincided template with the received image, among the plural templates. The plural templates are stored in advance, for example, in the memory 6. Then, the processor 7 stores the relative positional relationship between the display device 30 and the robot 11, which corresponds to the identified template, as a relative position between the display device 30 and the robot 11 at the start of the robot control processing in the memory 6. The relative position is represented, for example, as the positions of the robot 11 and the display device 30 and the orientation of the face of the operator in a world coordinate system whose origin is set at an installation position of the robot 11 or another reference point on a real space. In addition, since pixels on the image correspond one-to-one with directions viewed from the camera 3, the direction from the camera 3 toward the robot 11 can be obtained from a position of the centroid of a region on the image coincided with the identified template. Therefore, the processor 7 can determine the orientation of the head of the operator at the start of the robot control processing on the basis of the position of the centroid of the region on the image coincided with the identified template and a relationship between the orientation of the camera 3 and the orientation of the head of the operator.

Further, in a state where the robot 11 is in a predetermined posture, the processor 7 may store information representing an operation status of the servomotor, such as an encoder signal received through the communication interface 5 from the robot 11 in memory 6.

Additionally, when plural robots of the same type as the robot 11 are placed, the processor 7 executes processing similar to the processing for determining whether or not the robot represented in the image is the robot 11 controlled by the robot control device 1, as described in the foregoing modified example of the first embodiment, and thereby confirms that the robot represented in the image is the robot 11. Thereafter, the processor 7 may execute the calibration processing.

After the robot control processing starts, every time receiving a measurement signal from the display device 30, the determination unit 21 of the processor 7 determines whether or not the robot 11 is recognizable for the operator. In the second embodiment, the determination unit 21 determines whether or not the robot 11 is included in a visual range which the operator can visually recognize through the transmissive display 31, and when the robot 11 is included in the visually recognizable visual range, the determination unit 21 determines that the robot 11 is recognizable for the operator. To do this, the determination unit 21 estimates movements of the head of the operator by using a measurement signal received from the display device 30 after the calibration processing is executed, and thereby estimates the visual range. For example, every time receiving a measurement signal, the determination unit 21 calculates the amount of displacement of the position and orientation of the head of the operator over a period from the receipt time of the previous measurement signal to the receipt time of the latest measurement signal. For example, when a measurement signal represents an angular acceleration or acceleration of the display device 30 or the head of the operator, the determination unit 21 may calculate the amount of displacement of the position and orientation of the head of the operator by second order integration of the angular acceleration or the acceleration. Then, the determination unit 21 calculates the sum of the amount of displacement of the position and orientation of the head of the operator after the calibration processing is executed, and thereby may estimate the position and orientation of the head of the operator at the receipt time of the latest measurement signal. Further, the visually recognizable range which the operator can visually recognize through the transmissive display 31 is determined by the distance between the eyes of the operator and the transmissive display 31 when the display device 30 is put on the operator and by the size of a display area of the transmissive display 31. The visually recognizable range is represented by an angular range in a horizontal and vertical direction based on the forward direction from the operator and is stored in advance in the memory 6. Thus, the determination unit 21 can estimate the visual range of the operator at the receipt time of the latest measurement signal, which is represented in a world coordinate system, by using the estimated position and orientation of the head of the operator at the receipt time of the latest measurement signal and by using the visually recognizable range.

Further, the determination unit 21 can estimate the position and posture of the robot 11 at the receipt time of the latest measurement signal on the basis of an encoder signal from the robot 11 at the receipt time of the latest measurement signal. Then, the determination unit 21 can determine, by comparing the position and orientation of the robot 11 with the visual range of the operator at the receipt time of the latest measurement signal, whether or not the robot 11 is included in the visual range of the operator. In addition, not only when the entire robot 11 is included in the visual range of the operator but also when at least one of predetermined portions of the robot 11 (for example, each arm of the robot 11, an end of the robot 11, or a tool attached to the end of the robot 11) is included in the visual range of the operator, the determination unit 21 may determine that the robot 11 is included in the visual range of the operator.

Every time determining whether or not the robot 11 is included in the visual range of the operator, the determination unit 21 notifies the determination result to the control unit 22.

Every time receiving, from the determination unit 21, the determination result of whether or not the robot 11 is included in the visual range of the operator, the control unit 22 determines whether to stop motion of the robot 11 or not on the basis of the determination result. In other words, when the robot 11 is included in the visual range of the operator, the control unit 22 allows the robot 11 to continue operating. In contrast, when the robot 11 is not included in the visual range of the operator, the control unit 22 outputs a control signal for stopping the motion of the robot 11 through the communication interface 5 and the communication line 13 to the robot 11.

In addition, only when determining that the robot 11 is not included in the visual range of the operator, the determination unit 21 may notify the determination result to the control unit 22. Subsequently, when receiving, from the determination unit 21, the determination result that the robot 11 is not included in the visual range of the operator, the control unit 22 may output the control signal for stopping the motion of the robot 11 through the communication interface 5 and the communication line 13 to the robot 11.

Figure 6A:
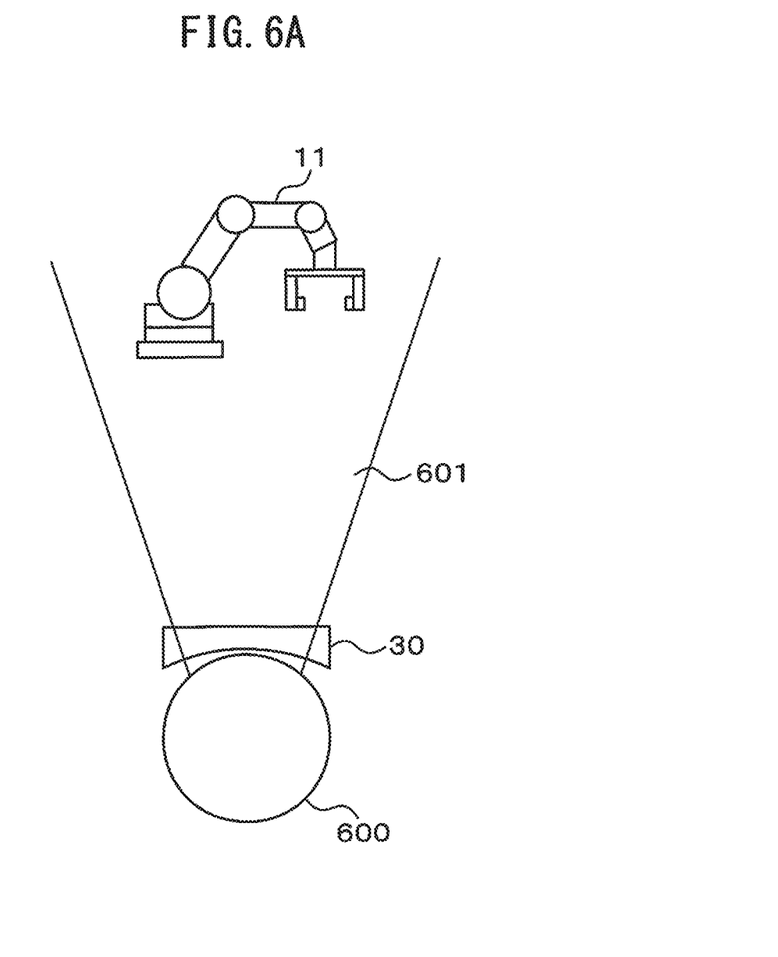
FIG. 6A is a diagram illustrating an example of a relationship between a positional relationship between a visual range of an operator and the robot and a control for the robot.
Figure 6B:
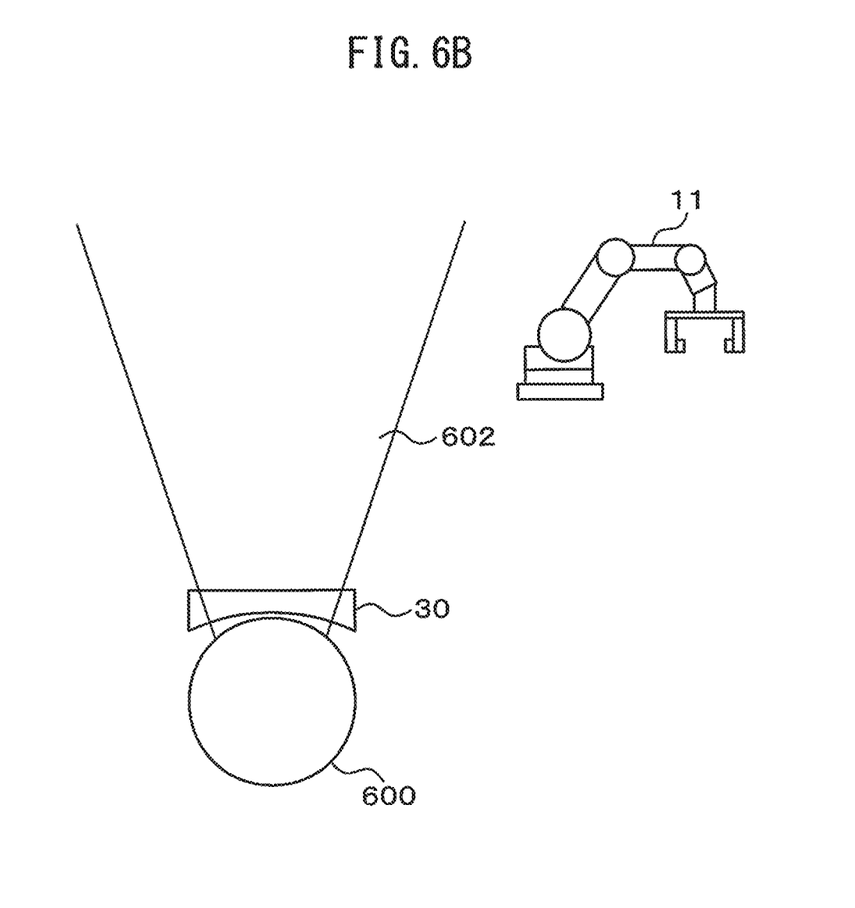
FIG. 6B is a diagram illustrating another example of a relationship between a positional relationship between a visual range of an operator and the robot and a control for the robot.

FIGS. 6A and 6B are drawings illustrating each example of a relationship between a positional relationship between a visual range of an operator and the robot 11 and a control for the robot 11. As illustrated in FIG. 6A, when the robot 11 is included in the visual range 601 which the operator 600 can visually recognize through the transmissive display of the display device 30, the operator can visually recognize the robot 11 through the display device 30. Therefore, the robot control device 1 does not stop motion of the robot 11. In contrast, as illustrated in FIG. 6B, when the robot 11 is not included in the visual range 602 which the operator 600 can visually recognize through the transmissive display of the display device 30, the operator cannot visually recognize the robot 11 through the display device 30. Therefore, the robot control device 1 stops the motion of the robot 11.

Figure 7:
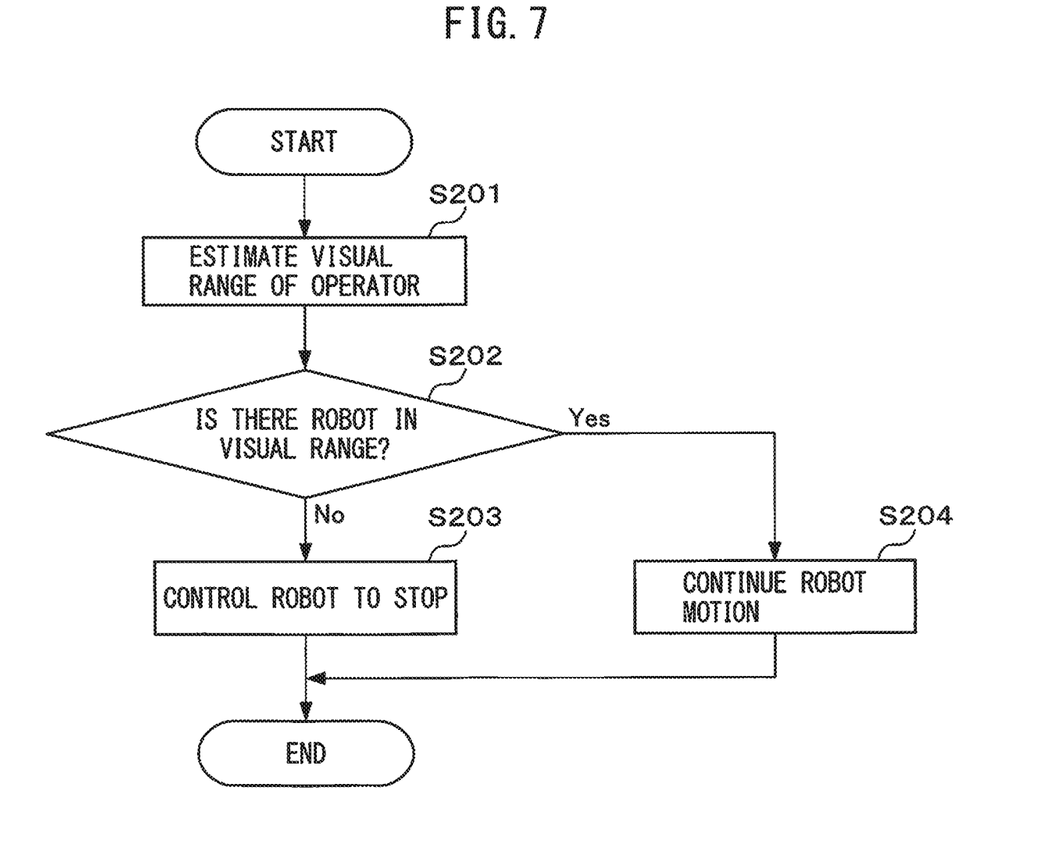
FIG. 7 is an operation flow chart of robot control processing according to the second embodiment.

FIG. 7 is an operation flow chart of robot control processing according to the second embodiment. For example, every time receiving a measurement signal generated by the sensor 32, the processor 7 executes the robot control processing in accordance with the following operation flow chart.

The determination unit 21 estimates, by using the received measurement signal, a visual range which the operator can visually recognize through the transmissive display 31 of the display device 30 (step S201). Then, the determination unit 21 determines whether or not the robot 11 is included in the visual range (step S202). When the robot 11 is not included in the visual range of the operator (No in step S202), the control unit 22 stops motion of the robot 11 (step S20).

In contrast, when the robot 11 is included in the visual range of the operator (Yes in step S203), the control unit 22 allows the robot 11 to continue operating (step S204).

After step S203 or S204, the processor 7 finishes the robot control processing.

As described above, the robot control device according to the second embodiment stops motion of a robot when the robot is not included in a visual range which an operator can visually recognize through a transmissive display of a display device put on the operator. Therefore, when the operator cannot confirm the motion of the robot, the robot control device according to the second embodiment can stop the motion of the robot regardless of the positional relationship between the operator and the robot. As a result, the robot control device can reduce a possible danger of contact of the robot with the operator or another object.

In addition, according to a modified example, when the determination unit 21 determines that the robot 11 is not included in a visual range of the operator over a certain period (for example, for 1 to 3 seconds), the control unit 22 may stop the motion of the robot 11. By doing so, when the robot 11 is out of the visual range of the operator for only a moment and immediately afterwards the robot 11 is included in the visual range, the robot control device 1 can continue the motion of the robot 11. Consequently, a decrease in working efficiency due to frequent stopping of the robot 11 can be prevented.

According to another modified example, when the calibration processing is executed, the processor 7 may incorporate plural templates corresponding to each of possible relative position between the display device 30 and the robot 11 into a wireless signal, and transmit the wireless signal to the display device 30. Then, the processor 35 of the display device 30 sequentially displays the received plural templates on the transmissive display 31. The operator executes, for example, through the input device (not illustrated), an operation for selecting one of the templates, which is most coincided with the robot 11 when the operator looks at the displayed template and the robot 11 in an overlapping manner. Thus, the processor 7 may determine a relative position corresponding to the template selected by the operator, as a relative position between the display device 30 and the robot 11 at the start of the robot control processing.

Alternatively, when the calibration processing is executed, the processor 7 incorporates a template, which corresponds to a possible relative position between the display device 30 and the robot 11, into a wireless signal, and transmit the wireless signal to the display device 30. Then, the processor 35 of the display device 30 displays the received template on the transmissive display 31. The operator moves so that the robot 11 coincides with the displayed template when the operator looks at the displayed template and the robot 11 in an overlapping manner, and may execute, through the input device (not illustrated), an operation representing that the robot 11 coincides with the template when the template coincides with the robot 11. Thus, the processor 7 may determine a relative position corresponding to the template, as a relative position between the display device 30 and the robot 11 at the start of the robot control processing.

According to the modified example, the camera 3 may be omitted.

According to still another modified example, instead of the camera 3, a 3D sensor may be attached to the display device 30. In this case, when the calibration processing is executed, the display device 30 transmits a wireless signal including a distance image generated by the 3D sensor to the body 12. Then, the processor 7 may execute processing for detecting the robot 11 or a predetermined portion of the robot 11 from the distance image included in the received wireless signal (for example, detection processing with a classifier or template matching), and thereby identifies a region on the distance image in which the robot 11 or the predetermined portion of the robot 11 is represented. Then, the processor 7 may detect a relative position between the display device 30 and the robot 11 on the basis of the region. In other words, the processor 7 may determine a direction corresponding to the centroid of the identified region as a direction from the display device 30 toward the robot 11, and may define a distance represented by an average value of values of pixels in the region as a distance between the display device 30 and the robot 11.

According to further still another modified example, if a distance between the operator and the robot 11 is equal or smaller than a predetermined lower threshold, the control unit 22 may stop motion of the robot 11 even when the robot 11 is included in a visual range which the operator can visually recognize through the transmissive display 31 of the display device 30 put on the operator. By doing so, the robot control device 1 can reduce a possible danger of a collision of the robot 11 with the operator when the operator is too close to the robot 11. Further, if the distance between the operator and the robot 11 is equal to or greater than a predetermined upper threshold, the control unit 22 may stop the motion of the robot 11 even when the robot 11 is included in the visual range which the operator can visually recognize through the transmissive display 31 of the display device 30 put on the operator. By doing so, when the operator is too separated from the robot 11 and has difficulty confirming details of the motion of the robot. 11, the robot control device 1 stops the motion of the robot 11 and thereby can reduce a possible danger of a collision of the robot 11 with another object.

Furthermore, in the foregoing embodiments and the foregoing modified examples, when it is determined that the robot 11 is not recognizable to an operator through the display device or the transmissive display of the display device, i.e., when the robot 11 is not displayed on the display device 30, when only a portion of the robot 11 is displayed on the display device 30, when a ratio of a region representing the robot 11 to the display area of the display device 30 is equal to or lower than a predetermined threshold, or when the robot 11 is not included in the estimated visual range, the control unit 22 may output a control signal for slowing down motion of the robot 11 through the communication interface 5 and the communication line 13 to the robot 11.

Additionally, in the foregoing embodiments or the modified examples of the embodiments, processing of both the determination unit 21 and the control unit 22 or processing of the determination unit 21 may be executed by a processor included in the display device 2. Moreover, the wireless communication interface 4, 33 may be replaced by a wire communication interface.

All examples and specific terms recited herein are intended to have teaching purpose to aid the reader in understanding the concepts contributed by the inventor to the present invention and furthering the art, and are to be construed so as not to limit the composition of any example and specific recited examples and conditions to indicate the superiority and inferiority of the invention in this specification. Although the embodiment of the present invention is described in detail, it is to be understood that various changes, substitutions, and modifications can be made hereto without departing from the spirit and scope of the invention.

What is claimed is:

1. A robot control device comprising:
   a camera configured to be attached to a display device carried by or put on an operator and capture an environment surrounding the operator to generate an image of the environment; and
   a processor configured to slow down or stop motion of a predetermined robot included in the environment when the robot is not displayed on the display device, when only a portion of the robot is displayed, or when a ratio of a region representing the robot to a display area of the display device is equal to or lower than a predetermined threshold.

2. The robot control device according to claim 1, wherein an identification marker for identifying the robot is applied to the predetermined robot, and
   when the identification marker representing the predetermined robot is not detected in the image displayed on the display device, the processor slows down or stops the motion of the predetermined robot.

3. The robot control device according to claim 1, wherein when motion of a robot displayed on the display device is different from motion instructed to the predetermined robot, the processor slows down or stops the motion of the predetermined robot.

4. A robot control device comprising:
a display device configured to be able to be worn by an operator and be able to display information generated by a computer in an overlapping manner with an actual environment;
a sensor configured to be attached to the display device or the head of the operator and output a measurement signal indicating an amount of displacement of the display device or an amount of displacement of the head of the operator; and
a processor configured to estimate a visual range being visually recognizable for the operator through the display device by using the measurement signal,
determine whether or not a predetermined robot included in the environment is included in the estimated visual range, and
slow down or stop motion of the predetermined robot when the predetermined robot is not included in the visual range.

* * * * *